United States Patent
Mukunashi

(10) Patent No.: US 9,635,265 B2
(45) Date of Patent: Apr. 25, 2017

(54) IMAGE PROCESSING APPARATUS AND METHOD OF CONTROLLING THE SAME

(71) Applicant: CANON KABUSHIKI KAISHA, Tokyo (JP)

(72) Inventor: Masayuki Mukunashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/625,275

(22) Filed: Feb. 18, 2015

(65) Prior Publication Data
US 2015/0237260 A1 Aug. 20, 2015

(30) Foreign Application Priority Data
Feb. 19, 2014 (JP) .................. 2014-029328

(51) Int. Cl.
*H04N 5/228* (2006.01)
*H04N 5/232* (2006.01)
*G02B 27/64* (2006.01)

(52) U.S. Cl.
CPC ....... *H04N 5/23287* (2013.01); *G02B 27/646* (2013.01); *H04N 5/23254* (2013.01); *H04N 5/23261* (2013.01)

(58) Field of Classification Search
USPC ...................................... 348/208.1
See application file for complete search history.

(56) References Cited

U.S. PATENT DOCUMENTS

2010/0158493 A1\* 6/2010 Miyasako .......... H04N 5/23212
396/55

FOREIGN PATENT DOCUMENTS

JP  04-163535 A  6/1992

\* cited by examiner

*Primary Examiner* — Stephen Coleman
(74) *Attorney, Agent, or Firm* — Cowan, Liebowitz & Latman, P.C.

(57) ABSTRACT

An image processing apparatus includes a motion detection unit (141) configured to detect motion of an object based on an output from an image pickup element, a first calculation unit (153a) configured to calculate, based on an output from the motion detection unit, a first change amount by which the object changes in a predetermined time, a second calculation unit (153b) configured to calculate, based on an output from a shake detection unit, a second change amount by which the apparatus changes in the predetermined time, and a determination unit (153c) configured to determine based on the first change amount and the second change amount whether to perform image capturing through use of an image stabilization unit configured to perform an image stabilization by moving an optical element in a direction different from a direction of an optical axis.

12 Claims, 10 Drawing Sheets

IMAGE PROCESSING APPARATUS AND METHOD OF CONTROLLING THE SAME

BACKGROUND OF THE INVENTION

Field of the Invention

The present invention relates to an image processing apparatus, and particularly relates to correction of image blur generated in follow shot image capturing.

Description of the Related Art

Follow shot (panning shot) is a conventional image capturing technique to express a speed of a moving object. The follow shot is performed by a user to capture an image in which the moving object is at rest while its background looks like moving, and is achieved by panning a camera following motion of the object. In follow shot image capturing, the user needs to perform panning following the motion of the object. However, a too fast or slow panning velocity results in a difference between a moving velocity of the object and the panning velocity, which may often generate a blurred image of the object.

Japanese Patent Laid-open No. 4-163535 discloses an image pickup apparatus in which part of an optical system of a lens or an image pickup unit during exposure is moved based on "a relative angular velocity of the object with respect to the image pickup apparatus that is calculated before exposure" and "an angular velocity of the image pickup apparatus during the exposure that is obtained from an angular velocity sensor" so as to correct any shake of the object (object blur). The relative angular velocity of the object with respect to the image pickup apparatus is calculated based on "a move amount of the object on an image plane that is detected from temporally sequential images" and by the "angular velocity sensor".

However, in the image pickup apparatus disclosed in Japanese Patent Laid-open No. 4-163535, the calculated relative angular velocity of the object needs to be maintained during the exposure when shake correction is performed. For example, in fast continuous image capturing, using the calculated relative angular velocity of the object at temporally largely different exposure timing may result in inappropriate shake correction because the moving velocity of the object may change meanwhile.

SUMMARY OF THE INVENTION

The present invention provides an image processing apparatus and a method of controlling the image processing apparatus that are capable of preventing shake correction from being performed inappropriately.

An image processing apparatus as one aspect of the present invention includes a motion detection unit configured to detect motion of an object based on an output from an image pickup element, a first calculation unit configured to calculate, based on an output from the motion detection unit, a first change amount by which the object changes in a predetermined time, a second calculation unit configured to calculate, based on an output from a shake detection unit, a second change amount by which the apparatus changes in the predetermined time, and a determination unit configured to determine based on the first change amount and the second change amount whether to perform image capturing through use of an image stabilization unit configured to perform image stabilization by moving an optical element in a direction different from a direction of an optical axis.

A method of controlling an image processing apparatus as another aspect of the present invention includes a shake detection step of detecting a shake, a motion detection step of detecting motion of an object based on an output from an image pickup element, a first calculation step of calculating, based on an output at the motion detection step, a first change amount by which the object changes in a predetermined time a second calculation step of calculating, based on an output at the shake detection step, a second change amount by which an image pickup apparatus changes in the predetermined time, and a determination step of determining based on the first change amount and the second change amount whether to perform image capturing through use of an image stabilization unit.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 3:
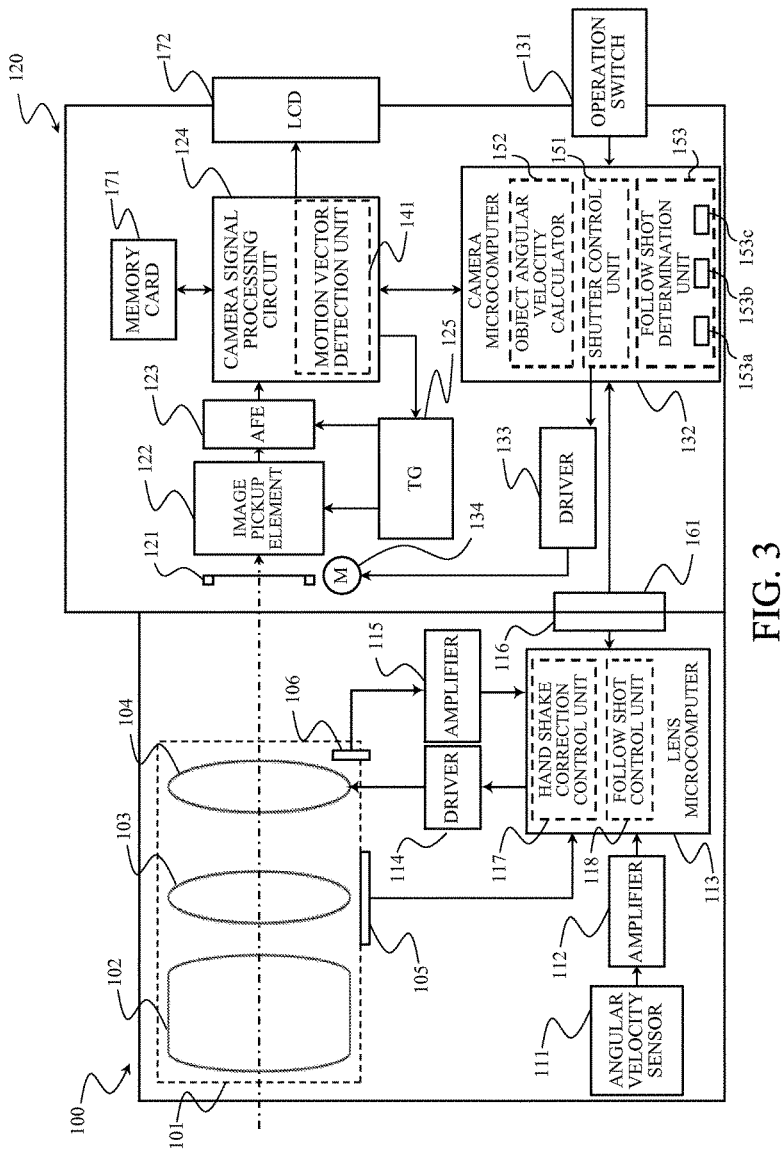
FIG. 3 is an entire configuration diagram of an image pickup apparatus in Embodiment 1 of the present invention.

FIG. 3 is a configuration diagram of an image pickup apparatus according to Embodiment 1 of the present invention. In FIG. 3, reference numeral 100 denotes an interchangeable lens, and reference numeral 120 denotes a camera body. The interchangeable lens 100 includes an image pickup lens unit 101. The image pickup lens unit 101 includes a main image pickup optical system 102, a zoom lens unit 103 capable of changing a focal length, and a shift lens unit 104 configured to optically correct an image shake with respect to an optical axis due to a shake of the image pickup apparatus by moving in a direction orthogonal to the optical axis (in a direction different from a direction of the optical axis). The interchangeable lens 100 also includes a zoom encoder 105 configured to detect a position of the zoom lens unit (hereinafter, simply referred to as a zoom lens), and a position sensor 106 configured to detect a position of the shift lens unit (hereinafter, simply referred to as a shift lens). The interchangeable lens 100 also includes an angular velocity sensor (shake detection unit) 111 configured to detect a shake of the image pickup apparatus, an amplifier 112 configured to amplify an output from the angular velocity sensor 111, and a lens system control microcomputer (hereinafter, referred to as a lens microcomputer) 113 as an image processing apparatus. The interchangeable lens 100 also includes a driver 114 configured to drive the shift lens, and an amplifier 115 configured to amplify an output from the position sensor 106 for the shift lens. The interchangeable lens 100 also includes a mount contact portion 116 for the camera body 120. The lens microcomputer 113 includes a hand shake correction control unit 117 configured to perform hand shake correction control, and a follow shot control unit 118 configured to perform follow shot assisting control. In addition, the lens microcomputer 113 performs, for example, focus lens control and aperture stop control, but those components responsible for these controls are omitted in FIG. 3 for simplification. Although hand shake correction requires detection and correction to be performed along two axes in, for example, a lateral direction and a longitudinal direction that are orthogonal to each other, these detection and correction along the two axes are performed by identical configurations, and thus only one of the configurations is illustrated in FIG. 3. As described above, the image pickup apparatus in the present invention includes an image stabilization unit (image stabilizer) configured to perform image stabilization by moving an optical element in the direction orthogonal to the optical axis.

The camera body 120 includes a shutter 121, an image pickup element 122 such as a CMOS sensor, an analog signal processing circuit (AFE) 123, and a camera signal processing circuit 124. The camera body 120 also includes a timing generator (TG) 125 that sets operation timings of the image pickup element 122 and the analog signal processing circuit 123. The camera body 120 also includes an operation switch 131 including a power switch, a release switch, and a switch (setting unit) for a follow shot assisting mode. The camera body 120 also includes a camera system control microcomputer (hereinafter, referred to as a camera microcomputer) 132 that controls an entire camera system, a driver 133 that drives a motor for a shutter operation, and a shutter drive motor 134. The camera body 120 includes a memory card 171 that records a captured image, a liquid crystal panel (hereinafter, referred to as an LCD) 172 that displays an image to be captured by the camera and displays a captured image, and a mount contact portion 161 for the interchangeable lens 100. The lens microcomputer 113 and the camera microcomputer 132 perform serial communication with each other in a predetermined timing through the mount contact portions 116 and 161.

The camera signal processing circuit 124 includes a motion vector detection unit (motion detection unit) 141 that detects motion of an object based on an output from the image pickup element. The camera microcomputer 132 includes a shutter control unit 151, an object angular velocity calculator 152 configured to calculate an angular velocity of a main object, and a follow shot determination unit 153. The follow shot determination unit 153 includes a first calculation unit 153a, a second calculation unit 153b, and a determination unit 153c.

In FIG. 3, when the camera is turned on through the operation switch 131, the camera microcomputer 132 detects this state change, and then controls power supply to each circuit in the camera body 120 and performs initial setting thereof. The interchangeable lens 100 is supplied with power and provided with internal initial setting under control of the lens microcomputer 113. The lens microcomputer 113 and the camera microcomputer 132 start communication with each other in the predetermined timing. This communication involves transferring of, for example, a state of the camera and image capturing setting from the camera to the lens, and focal length information and angular velocity information of the lens from the lens to the camera, at appropriate timings.

In a normal mode in which the follow shot assisting mode is not set, the angular velocity sensor 111 in the interchangeable lens detects a shake of the camera due to, for example, a hand shake. This detection result is used by the hand shake correction control unit 117 to perform a hand shake correction operation by moving the shift lens 104.

Figure 4:
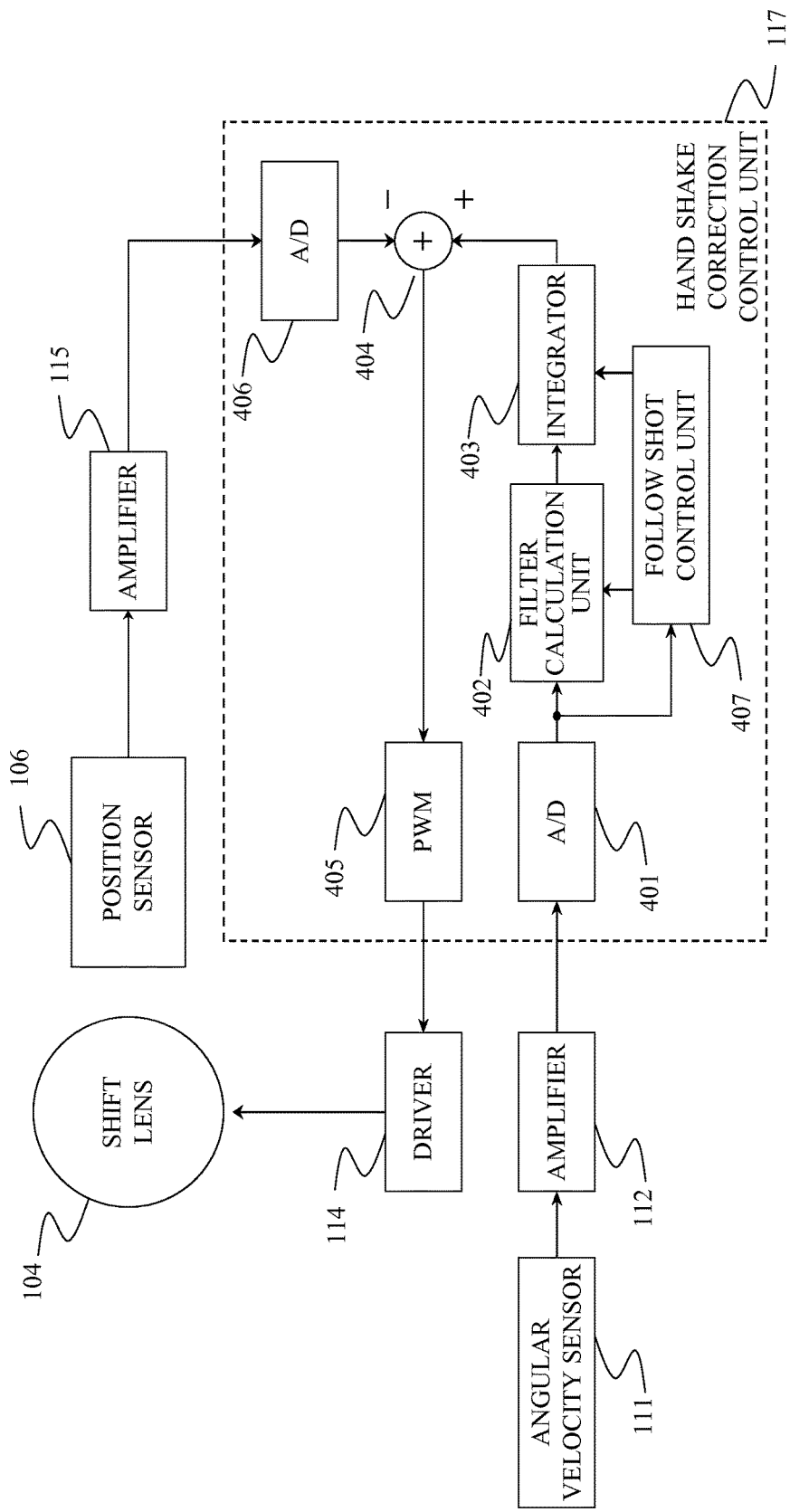
FIG. 4 is a configuration diagram of hand shake correction control.

This hand shake correction function is described below. FIG. 4 is a configuration diagram related to the hand shake correction operation, where the same components as those in FIG. 3 are denoted by the same reference numerals, and description thereof will be omitted. In FIG. 4, reference numerals 401 to 407 denote components in a detailed configuration of the hand shake correction control unit 117. Reference numeral 401 denotes an A/D converter that converts a shake signal detected by the angular velocity sensor 111 into a digital signal. Data sampling of outputs of the angular velocity sensor is performed at 1 to 10 kHz approximately. Reference numeral 402 denotes a filter calculation unit including, for example, a high-pass filter (HPF) and configured to remove an offset component included in the output of the angular velocity sensor and to change its cutoff frequency so as to deal with panning. Reference numeral 403 denotes an integrator that converts angular velocity data into angular displacement data to generate drive target data for the shift lens. Reference numeral 406 denotes an A/D converter that converts an output from the position sensor 106 into digital data. Reference numeral 404 denotes an adder that calculates real drive data for the shift lens by subtracting a current position of the shift lens from a drive target value of the shift lens. Reference numeral 405 denotes a PWM output unit that outputs the calculated drive data to the driver 114 for driving the shift lens. Reference numeral 407 denotes a follow shot control unit configured to determine based on the angular velocity data whether the camera is panned. When it is determined that the camera is panned, the cutoff frequency change of the filter calculation unit 402 is controlled, and the output of the integrator 403 is adjusted.

Figure 5:
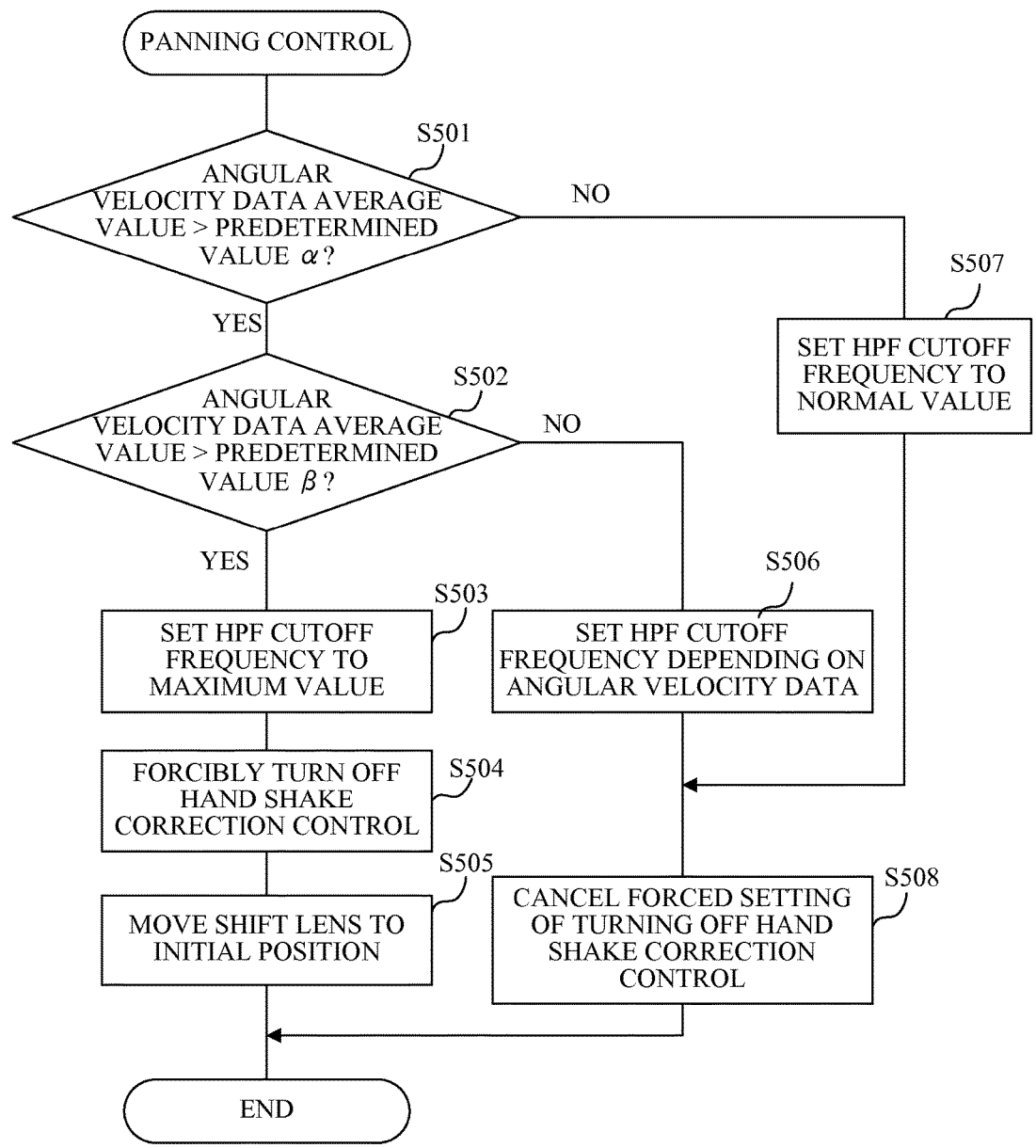
FIG. 5 is a flowchart of panning control.

FIG. 5 is a flowchart of an exemplary panning control of the hand shake correction control unit 117 in the lens microcomputer 113. The panning control will be described with reference to FIG. 5 below.

In FIG. 5, at step S501, it is determined whether an average value (average value of a predetermined number of sampled data) of angular velocity data input to the A/D converter 401 is greater than a predetermined value $\alpha$. When the average value is not greater than the predetermined value $\alpha$, it is determined that panning is not performed. When the average value is greater than the predetermined value $\alpha$, it is determined at step S502 whether the average value is greater than a predetermined value $\beta$. When the average value is not greater than the predetermined value $\beta$, it is determined that slow panning is performed. When the average value is greater than the predetermined value $\beta$, it is determined that fast panning is performed, and then the cutoff frequency of the HPF in the filter calculation unit 402 is set to a maximum value at step S503, and the hand shake correction control is forcibly turned off at step S504. This setting of the high cutoff frequency of the HPF allows the shift lens to gradually stop, thereby reducing any sense of discomfort when the hand shake correction control is turned off. Since a move amount in the fast panning is significantly larger than a size of a hand shake, any hand shake remaining uncorrected when the hand shake correction control is turned off causes no sense of discomfort. Without this setting, correction of the panning as a large hand shake would cause a displayed image to stop at start of the panning, and then suddenly and largely move at a moment when the shift lens 104 reaches at an end of a correction range, which is a significantly awkward motion. Subsequently, at step S505, the output of the integrator 403 is gradually changed from current data to data of an initial position so as to move the shift lens 104 to the initial position. This movement is required because the position of the shift lens is desirably at the initial position in a drive range when a next hand shake correction operation is started.

When it is determined at step S502 that the average value of the angular velocity data is not greater than the predetermined value β (when it is determined that the slow panning is performed), the flow proceeds to step S506. Then, the cutoff frequency of the HPF is set depending on a size of the angular velocity data. This processing is needed to perform such a hand shake correction that a displayed image can be followed naturally in the slow panning because any hand shake has measurable influence when the slow panning is performed. When it is determined at step S501 that the average value of the angular velocity data is not greater than the predetermined value α (when it is determined that no panning is performed), the cutoff frequency of the HPF is set to a normal value at step S507. When it is determined at step S502 that the fast panning is not performed, the forced setting of turning off the hand shake correction control is cancelled at step S508.

Figure 7:
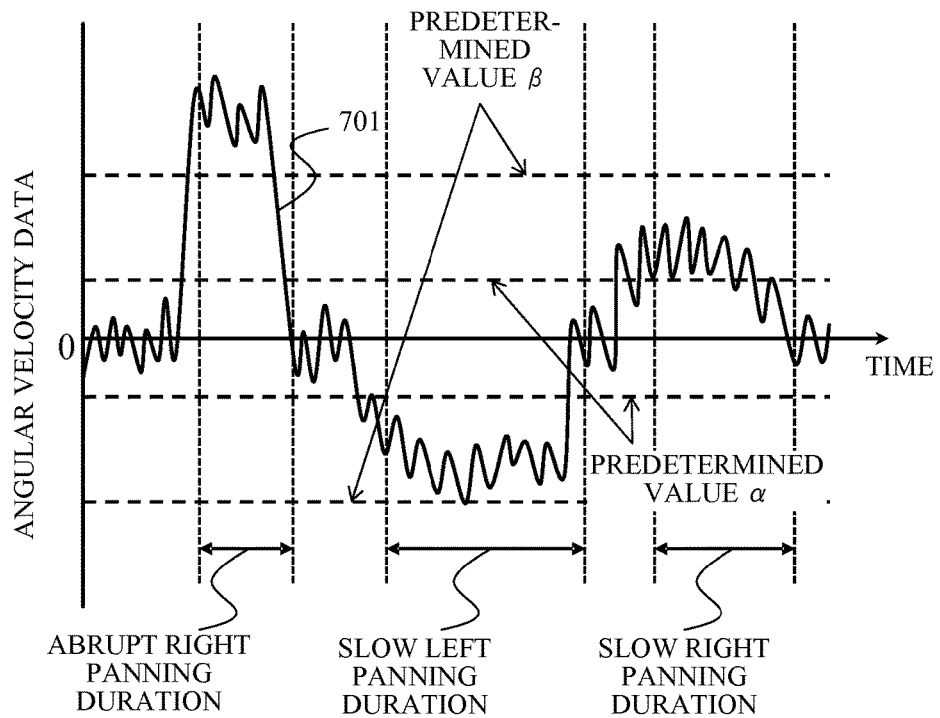
FIG. 7 illustrates a panning determination threshold.

FIG. 7 illustrates a relation between the angular velocity data in the lateral direction and the predetermined values α and β in panning, and reference numeral 701 denotes sample angular velocity data. In this example, panning in a right direction generates an output in a positive direction, and panning in a left direction generates an output in a negative direction. In the example illustrated in FIG. 7, an abrupt panning in the right direction and a slow panning in the left and right directions are detected. As illustrated in FIG. 7, the angular velocity data is largely off an initial value (zero in this example) in panning. Thus, calculation of the drive target value of the shift lens through integration of this data would obtain an extremely large value for the output of the integrator due to a DC offset component, leaving the shift lens out of control. To avoid this problem, the high cutoff frequency of the HPF needs to be set so as to cut the DC component when panning is detected. In an abrupt panning, in which this problem is more serious, the cutoff frequency is further increased to prevent the output of the integrator from increasing. In particular, in a fast panning, motion of a displayed image at a velocity of the panning is extremely larger than a hand shake, and thus no sense of discomfort is caused when the hand shake correction function is turned off in a direction of the panning.

The panning control described above enables an image that causes no sense of discomfort to be displayed in panning.

Back in FIG. 3, when the follow shot assisting mode is set through the operation switch 131, the camera microcomputer 132 is switched to its follow shot assisting control. This information is transmitted from the camera microcomputer 132 to the lens microcomputer 113, and then the lens microcomputer 113 is switched to its follow shot assisting mode.

The camera body 120 in the follow shot assisting mode outputs a motion vector of the object that is detected from captured image information by the motion vector detection unit 141 in the camera signal processing circuit 124. Simultaneously, the camera body 120 receives, from the lens microcomputer 113, the angular velocity data detected by the angular velocity sensor in the interchangeable lens 100.

When a user is performing a follow shot, the motion vector detection unit 141 outputs two kinds of motion vectors of the object, which are a vector corresponding to a main object (specific object) of which image the user is trying to capture, and a vector corresponding to a moving background. To achieve the follow shot, one of the two detected motion vectors that has a smaller motion amount is set as the motion vector of the main object, and a magnitude of this motion vector is set as the move amount of the main object on an image plane.

The angular velocity data received from the lens corresponds to a follow shot velocity of the camera. Thus, subtraction of the received angular velocity data from angular velocity data calculated based on the move amount of the main object on the image plane and a current focal length of the lens yields relative angular velocity data of the main object with respect to the camera. The camera microcomputer transmits this calculated angular velocity data of the main object to the lens microcomputer 113.

Figure 6:
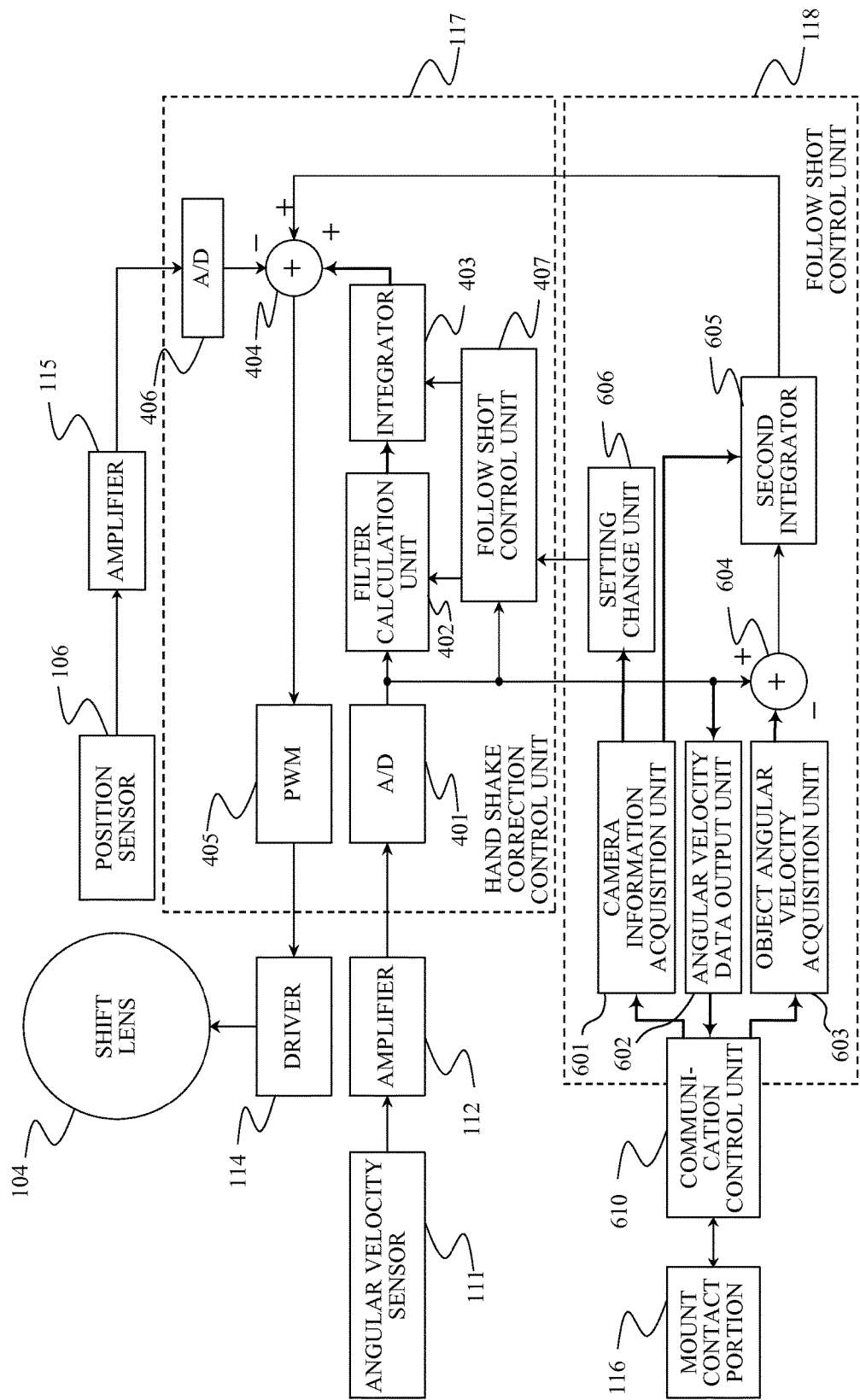
FIG. 6 is a configuration diagram of follow shot assist control.

FIG. 6 is a configuration diagram related to drive control of the shift lens in the interchangeable lens in the follow shot assisting mode, where the same components as those in FIGS. 3 and 4 are denoted by the same reference numerals. In FIG. 6, reference numerals 601 to 606 denote components in a detailed configuration of the follow shot control unit (control unit) 118. Reference numeral 601 denotes a camera information acquisition unit that acquires setting information of the follow shot assisting mode and release information, in particular. Reference numeral 602 denotes an angular velocity data output unit that transmits angular velocity data to the camera microcomputer and samples the angular velocity data in a predetermined timing. Reference numeral 603 denotes an object angular velocity acquisition unit that acquires, based on camera information obtained through communication, angular velocity information of the main object that is needed in follow shot assisting. Reference numeral 604 denotes an adder that calculates a difference between the angular velocity data of the camera and the angular velocity data of the object, and reference numeral 605 denotes a second integrator that performs an integration operation only in a predetermined duration. Reference numeral 606 denotes a setting change unit that changes setting in accordance with mode information acquired by the camera information acquisition unit. Reference numeral 610 denotes a communication control unit in the lens microcomputer 113 to perform bidirectional communication with the camera microcomputer.

The follow shot determination unit 153 (second calculation unit 153b) is capable of integrating and holding the angular velocity data transmitted from the lens microcomputer 113. The follow shot determination unit 153 is also capable of resetting this held integration data in a predetermined timing. This allows an angle (hereinafter, referred to as a follow shot angle) change of the camera to be measured from the predetermined timing when the user performs a follow shot.

When the follow shot assisting mode is set through a switch operation on the camera body, this information is read by the camera information acquisition unit 601 from the communication control unit 610, and transmitted to the setting change unit 606. The setting change unit 606 changes setting of the follow shot control unit 407 in accordance with this transmitted mode information. This setting change is preparation for an abrupt panning, and specifically, is a change of the predetermined values β and α used in panning determination. The angular velocity data output unit 602 transmits information to the communication control unit 610 to transmit detected angular velocity data to the camera body. Then, the object angular velocity acquisition unit 603 acquires relative angular velocity information of the main object that is to be transmitted from the camera body to the lens microcomputer 113. The adder 604 calculates a difference between the angular velocity data detected by the angular velocity sensor and the relative angular velocity information of the main object, and transmits the difference to the second integrator 605. The second integrator 605 starts the integration operation in response to a signal acquired by the camera information acquisition unit 601 and indicating an exposure period, and outputs a value to position the shift lens at a middle of the drive range out of the exposure period. When the exposure period ends, the shift lens abruptly moves from a current position of the shift lens to the middle position. However, right after the exposure period ends, no image is displayed on the LCD since data is being read from sensors, and thus the motion of the image due to the abrupt movement of the shift lens causes no problem. The adder 404 adds an output from the second integrator 605 together with an output from the integrator 403 and position information of the shift lens so as to calculate a drive amount of the shift lens.

Immediately after the user starts a follow shot operation in the follow shot assisting mode, the follow shot control unit 407 prohibits any shake correction operation in the interchangeable lens in the panning control for an abrupt panning. Then, the shift lens is moved to correct an amount corresponding to a difference between an angular velocity of the camera in panning and an angular velocity of the object. This operation of the shift lens compensates the difference between the panning velocity of the camera and the velocity of the object in an exposure period, which would otherwise cause a failure in the follow shot, thereby achieving a successful follow shot.

Figure 2:
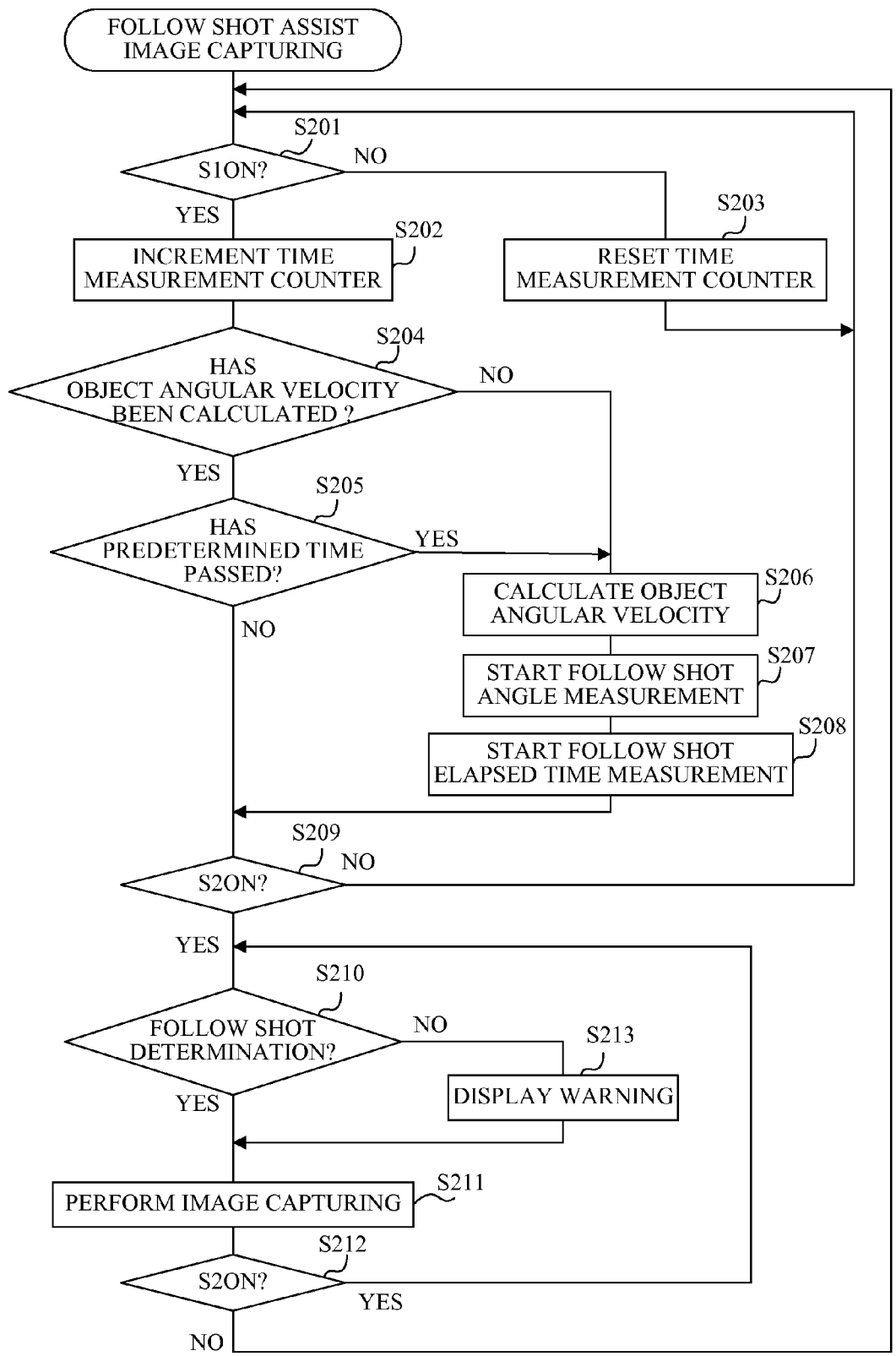
FIG. 2 is a flowchart of follow shot assist image capturing in Embodiment 1 of the present invention.

FIG. 2 is a flowchart illustrating a characteristic of the present invention and followed by the camera microcomputer 132, and specifically, a flowchart followed by an image capturing sequence unit in the follow shot assisting mode. In FIG. 2, at step S201, it is detected whether the release switch is pressed halfway (S1ON). When the release switch is pressed halfway, the flow proceeds to step S202 and a time measurement counter is incremented. When the release switch is not pressed halfway, the flow proceeds to step S203, and the time measurement counter is reset until the release switch is pressed halfway. At step S204, it is checked whether the relative angular velocity of the main object is already calculated. When the relative angular velocity of the main object is calculated, it is checked at step S205 whether the time measurement counter is at a predetermined time T. When the relative angular velocity of the main object is not calculated yet, or a predetermined time has elapsed since the relative angular velocity of the main object was calculated, the relative angular velocity of the main object is calculated at step S206. The angular velocity of the main object is calculated again to deal with a case where the velocity of the main object has changed with time. The relative angular velocity of the main object is transmitted to the lens microcomputer 113 each time it is calculated at step S206. At step S207, the follow shot angle being integrated at the follow shot determination unit 153 is reset and its measurement is started. At step S208, a follow shot elapsed time being measured at the follow shot determination unit 153 is reset and its measurement is started. At step S209, it is determined whether the release switch is fully pressed (S2ON). When the release switch is not fully pressed, the flow returns to step S201. When the release switch is fully pressed at step S209, follow shot determination (described later) is performed at step S210. When the follow shot determination finds that a follow shot is allowed, image capturing is finished with current camera setting at step S211. When the follow shot is not allowed, a warning is displayed on the LCD 172 (warning unit) at step S213 and the processing at step S211 (image capturing with the follow shot assisting mode being cancelled) is performed. Subsequently, it is determined at step S212 whether the release switch is fully pressed. When the release switch is fully pressed, the flow returns to step S210 and next image capturing is started. When the release switch is not fully pressed, the flow returns to step S201.

Figure 1:
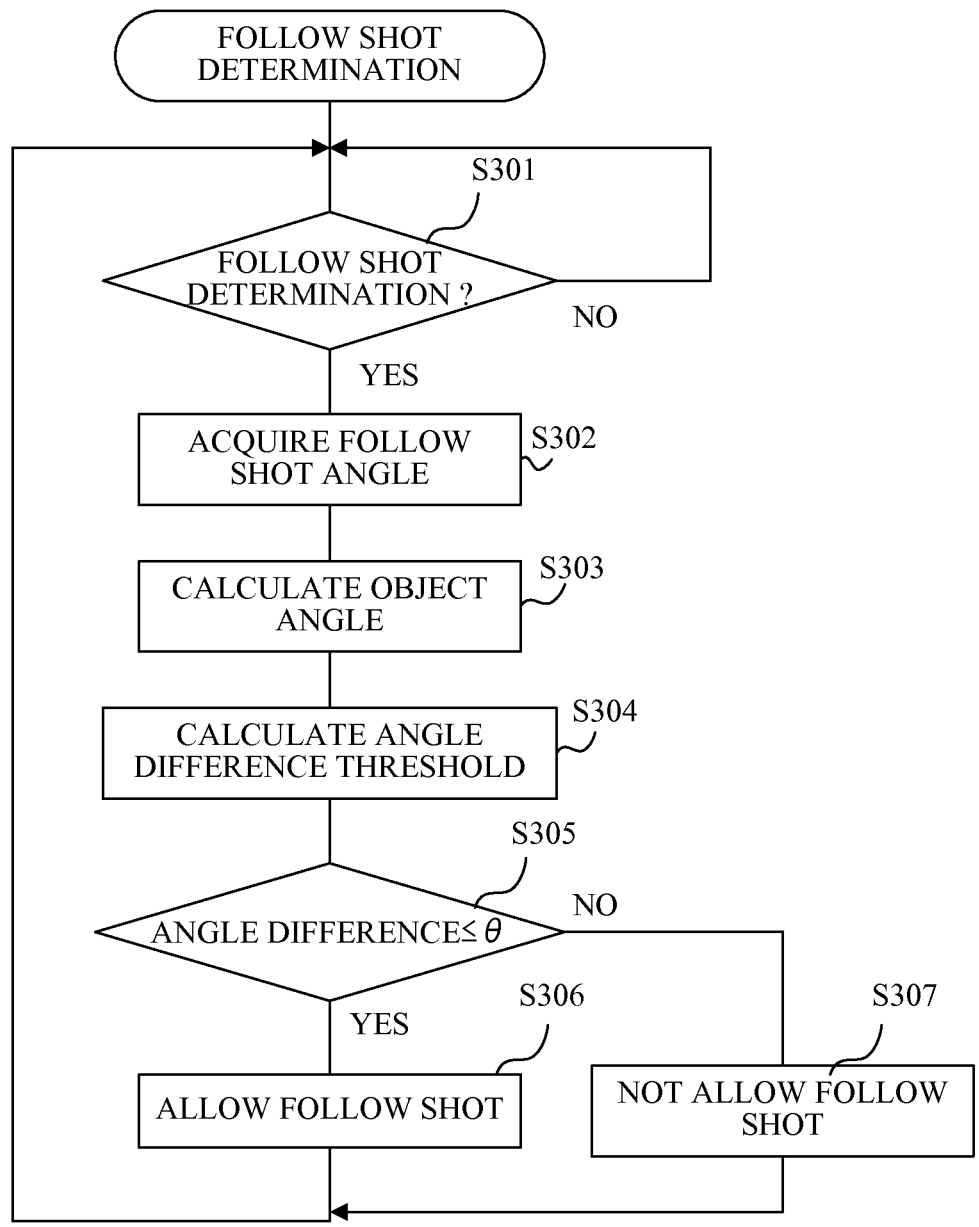
FIG. 1 is a flowchart of follow shot determination according to an embodiment of the present invention.
Figure 8:
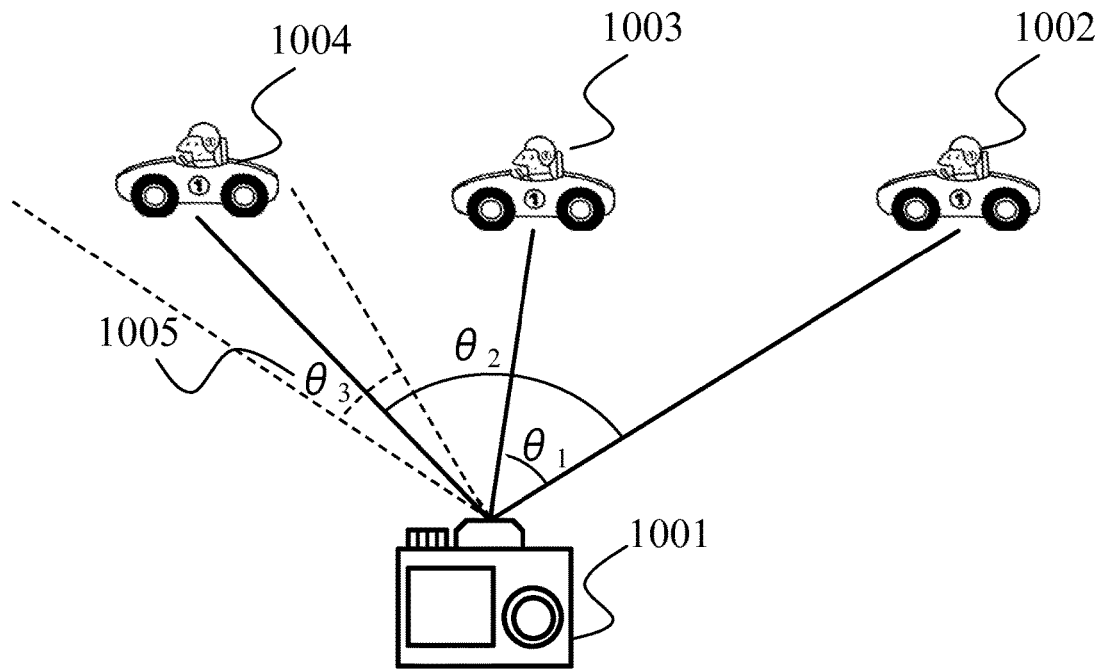
FIG. 8 is a conceptual diagram of follow shot assist image capturing determination.

FIG. 1 is a flowchart illustrating a characteristic of the present invention and followed by the follow shot determination unit 153 (a first calculation unit 153a, a second calculation unit 153b, and a determination unit 153c) in the camera microcomputer 132. The first calculation unit 153a, the second calculation unit 153b, and the determination unit 153c constitute an image processing apparatus. The image processing apparatus may include the motion vector detection unit 141. At step S301, when the camera is in the follow shot assisting mode, the flow proceeds to step S302, and otherwise, the flow returns to step S301. At step S302, the follow shot angle is acquired and the flow proceeds to step S303. At step S303, an object angle (estimated object angle) when the object maintains the angular velocity thereof is calculated from the angular velocity thereof and the follow shot elapsed time, and the flow proceeds to step S304. At step S304, a threshold (follow shot threshold) θ of the angle used in follow shot determination is calculated, and the flow proceeds to step S305. The follow shot threshold is smaller for a larger focal length (smaller angle of view). In this example, the threshold is an angle of view calculated from the focal length. At step S305, an absolute value of a difference between the estimated object angle (a first change amount or a first angle) and the follow shot angle (a second change amount or a second angle) is compared to the follow shot threshold. When the difference is not greater than the threshold, the flow proceeds to step S306, and otherwise, the flow proceeds to step S307. At step S306, follow shot assist image capturing is allowed, and at step S307, cancellation of the follow shot assisting mode is notified to the lens microcomputer 113 so as not to allow (to prohibit) the follow shot assist image capturing. In other words, the follow shot determination unit 153 determines based on the first angle (first change amount), the second angle (second change amount), and the threshold, whether to perform the image capturing (follow shot assist image capturing) by the image stabilization unit. More specifically, when a difference between the first angle and the second angle is not greater than the threshold, it is determined to perform the image capturing through the use of the image stabilization unit, and when the difference is greater than the threshold, it is determined not to perform the image capturing through the use of the image stabilization unit. FIG. 8 is a conceptual diagram of control of the follow shot determination unit. Reference numeral 1001 denotes a camera, and reference numeral 1002 denotes a first position of the object at timing when the angular velocity of the object is calculated. Reference numeral 1003 denotes a second position of the object when the object has moved at the calculated angular velocity for a predetermined time, and an angle between the positions 1002 and 1003 is denoted by a virtual object angle $\theta_1$. This virtual object angle $\theta_1$ is an angle (the first angle) centering on the camera 1001 between the first position 1002 of the object and the second position 1003 at which the object arrives in the predetermined time. Reference numeral 1004 denotes a real position of the object that is calculated based on information from the angular velocity sensor 111, and an angle between the positions 1002 and 1004 is denoted by a follow shot angle $\theta_2$. This follow shot angle $\theta_2$ is the second angle by which the camera 1001 moves (rotates) in the predetermined time. Reference numeral 1005 denotes an angle of view $\theta_3$ at the image capturing. When $|\theta_1-\theta_2|$ is not greater than $\theta_3$, a determination is made to allow the follow shot assist image capturing.

The present embodiment does not perform a follow shot shake correction in assisting the user with the follow shot image capturing, when the relative angular velocity of the object at detection may potentially not be maintained in the exposure period in which a shake correction is performed, thereby preventing a shake correction that would result in undercorrection or overcorrection. Thus, the present invention can prevent the shake correction from being performed inappropriately.

Embodiment 2

Figure 9:
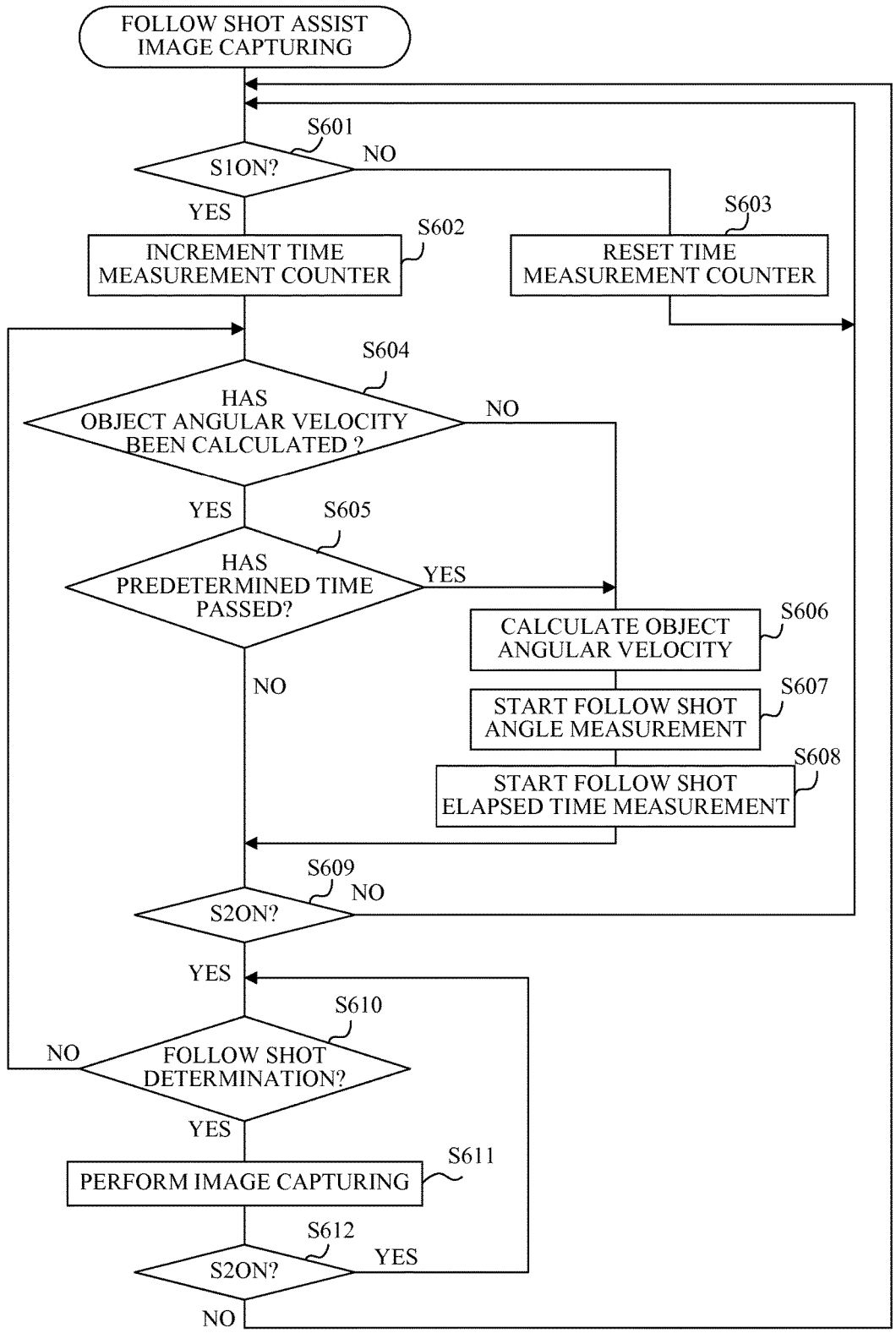
FIG. 9 is a flowchart of follow shot assist image capturing in Embodiment 2 of the present invention.

Next, Embodiment 2 of the present invention will be described. The present embodiment differs from Embodiment 1 in the processing to be performed when the follow shot determination finds that a follow shot is not allowed (No at step S210) in the flowchart followed by the image capturing sequence unit in the follow shot assisting mode. FIG. 9 illustrates a flowchart followed by the image capturing sequence unit in the follow shot assisting mode in the present embodiment. In the present embodiment, processing at step S610 replaces the processing at step S210 in Embodiment 1. Other processing is the same as that in Embodiment 1, and thus description thereof will be omitted. At step S610, the follow shot determination in Embodiment 1 is performed. When the follow shot determination finds that a follow shot is allowed, the flow proceeds to step S611. When the follow shot determination finds that a follow shot is not allowed, the flow returns to step S604 where the relative angular velocity of the object is calculated again. Since the follow shot assist image capturing is always performed in the follow shot assisting mode, the warning display processing (step S213) is not performed.

In Embodiment 1, when the follow shot determination finds that a follow shot is not allowed, the follow shot assist image capturing is not performed, thereby preventing a shake correction that would result in undercorrection or overcorrection. However, the shake correction is desired to be performed if it is effective. In the present embodiment, when the follow shot determination finds that a follow shot is not allowed, the relative angular velocity of the object is detected again to perform an effective shake correction. Thus, the present invention can prevent the shake correction from being performed inappropriately.

Embodiment 3

Figure 10:
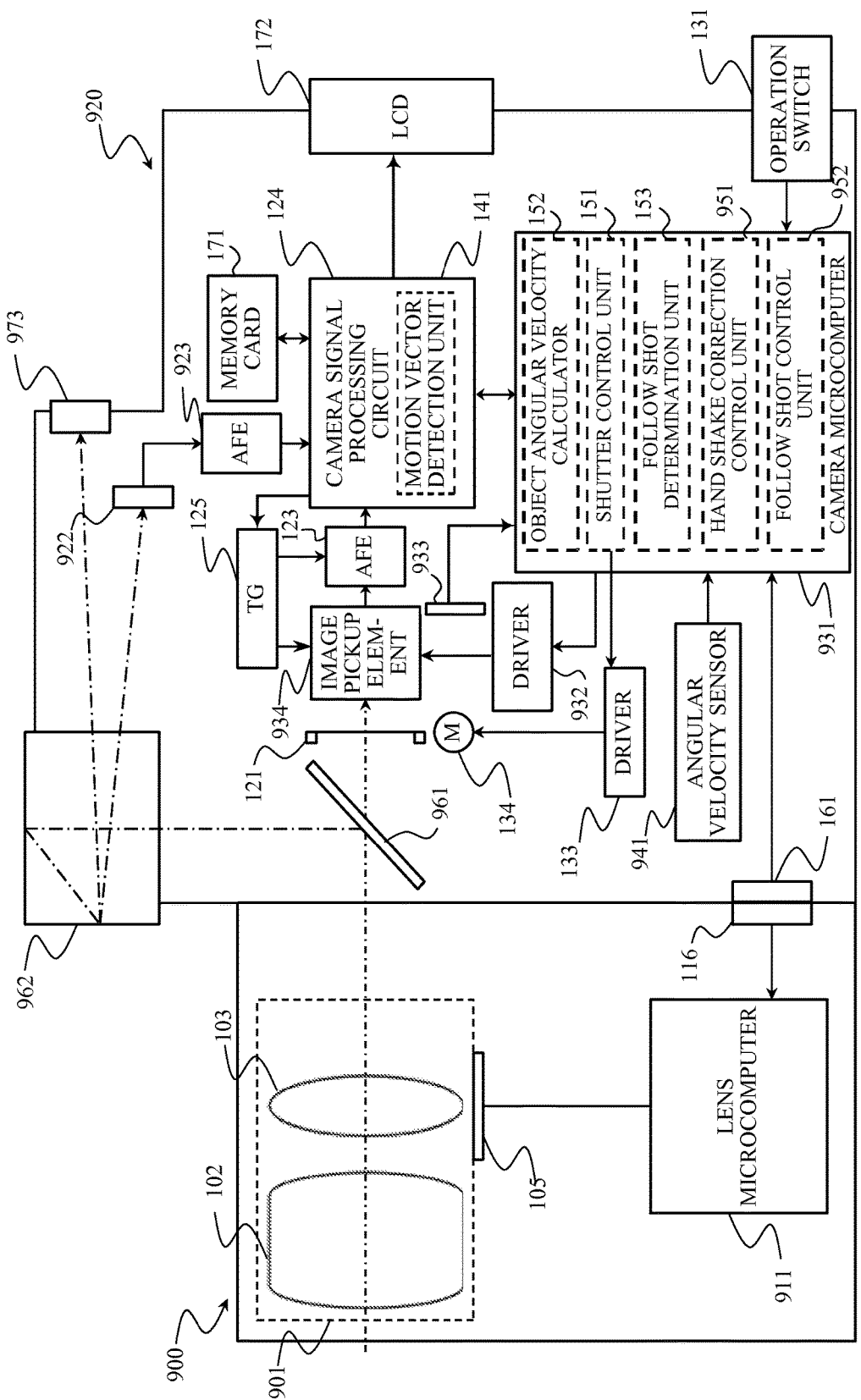
FIG. 10 is an entire configuration diagram of an image pickup apparatus in Embodiment 3 of the present invention.

FIG. 10 is a configuration diagram of Embodiment 3 of the present invention and illustrates a configuration of a single-lens reflex camera having a follow shot assist function. The hand shake correction function is mounted on not a lens in the interchangeable lens but the camera body. In FIG. 10, the same components as those in FIG. 3 are denoted by the same reference numerals, and description thereof will be omitted.

In FIG. 10, reference numeral 900 denotes this interchangeable lens, and reference numeral 920 denotes this camera body. In the interchangeable lens 900, reference numeral 901 denotes an image pickup lens unit, and reference numeral 911 denotes a lens microcomputer that detects a position of the zoom lens 103 through the zoom encoder 105 to obtain the focal length. The lens microcomputer 911 also controls an aperture stop (not illustrated), for example.

In the camera body 920, reference numeral 973 denotes an optical finder, reference numeral 961 denotes a main mirror, reference numeral 962 denotes a penta prism unit, reference numeral 922 denotes a metering sensor, and reference numeral 923 denotes an analog signal processing circuit (AFE) for output from the metering sensor. A partial light beam condensed through the image pickup lens 901 is reflected by the main mirror 961 into the penta prism unit 962 and then forms an image on the metering sensor 922 and the optical finder 973.

Reference numeral 934 denotes an image pickup element disposed movably in the direction orthogonal to the optical axis, reference numeral 931 denotes a camera microcomputer, and reference numeral 932 denotes a driver that moves a position of the image pickup element 934 in the direction orthogonal to the optical axis so as to perform a shake correction operation. Reference numeral 933 denotes a position sensor that detects the position of the image pickup element, and reference numeral 941 denotes an angular velocity sensor that detects any shake of the camera. In the camera microcomputer 931, reference numeral 951 denotes a hand shake correction control unit, and reference numeral 952 denotes a follow shot control unit.

Figure 11:
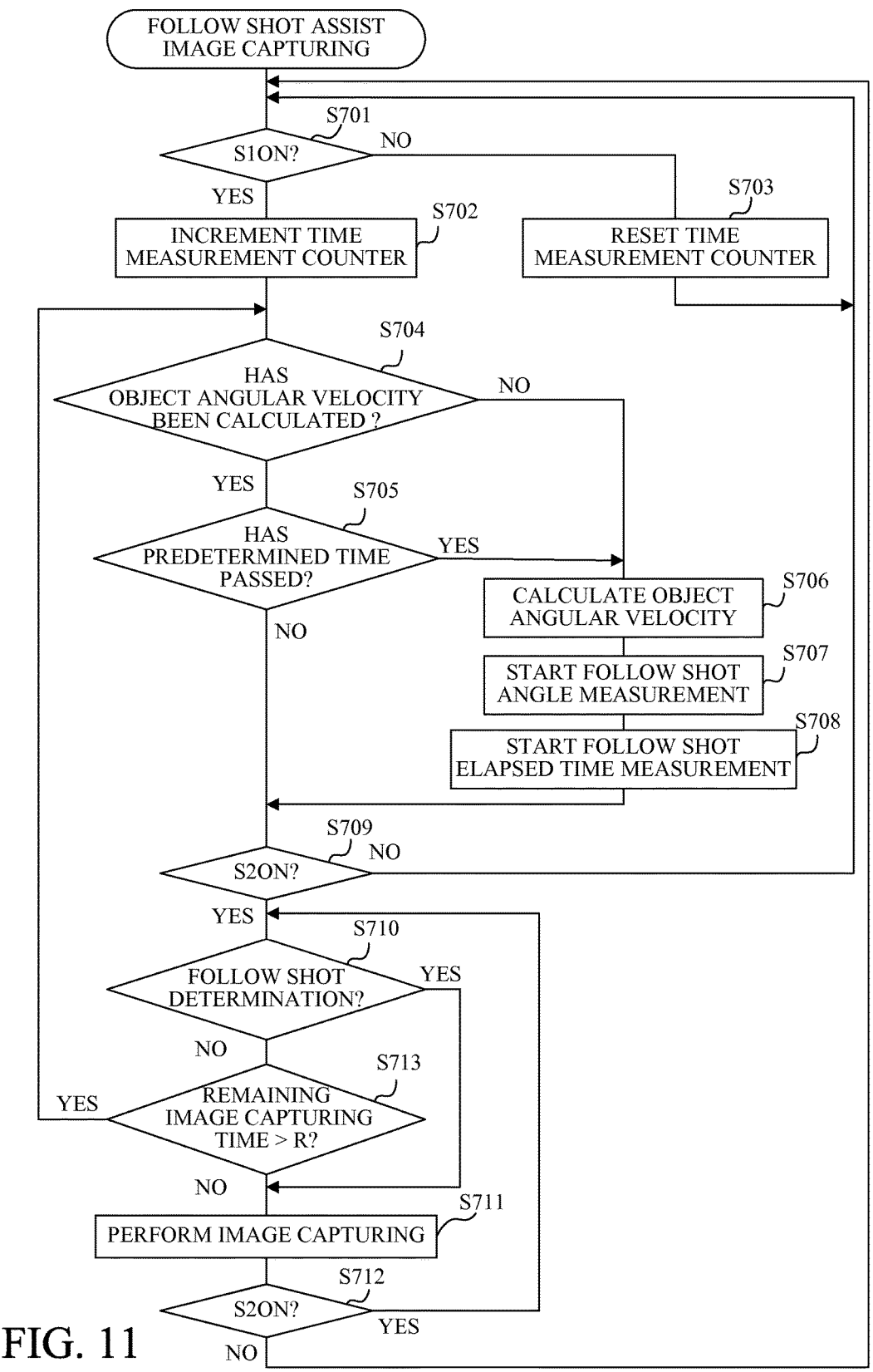
FIG. 11 is a flowchart of follow shot assist image capturing in Embodiment 3 of the present invention.

The hand shake correction control unit 951 acquires the position of the shift lens in Embodiment 1, but can acquire the position of the image pickup element in the present embodiment. The follow shot control unit 952 changes the position of the shift lens in Embodiment 1, but can change the position of the image pickup element in the present embodiment. In the present embodiment, the follow shot control unit 952 is incorporated in the camera microcomputer, but performs the same internal control as that in Embodiment 1. In the present embodiment, unlike Embodiment 1, the image pickup element instead of the shift lens is moved in the direction orthogonal to the optical axis so as to perform the shake correction operation or follow shot assist operation. FIG. 11 is a flowchart followed by the image capturing sequence unit in the follow shot assisting mode in the present embodiment. In the present embodiment, interframe time determination (step S713) is added to the flowchart followed by the image capturing sequence unit in the follow shot assisting mode in Embodiment 2. Other processing is the same as that in Embodiment 2, and thus description thereof will be omitted. When the follow shot assist image capturing is not allowed at step S710, the flow proceeds to step S713. At step S713, when a time until next image capturing (exposure) starts is greater than a threshold R (Yes at step S713), the flow returns to step S704 and the processing at step S706 is performed. When the time is not greater than the threshold R (No at step S713), the processing at step S711 (image capturing with the follow shot assisting mode being cancelled) is performed. The flow at step S713 always proceeds to the processing at step S711 at the first image capturing in continuous image capturing. The threshold R is a time needed to detect the angular velocity of the object. Although not illustrated, when the follow shot assist image capturing is not allowed at step S713, a warning may be displayed on the LCD 172 or a display device in the finder instead of performing the follow shot assist image capturing.

In Embodiment 2, the relative angular velocity of the object is detected again whenever the follow shot determination finds that a follow shot is not allowed. However, when it takes time to detect the relative angular velocity of the object again, a release time lag and a continuous image capturing interframe delay occur. In the present embodiment, when the release time lag and the interframe delay are maintained adequately, the shake correction with high user operability can be performed by detecting the relative angular velocity of the object again. Thus, the present invention can prevent the shake correction from being performed inappropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is favorably applicable to an image pickup apparatus such as a compact digital camera, a single-lens reflex camera, and a video camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

This application claims the benefit of Japanese Patent Application No. 2014-029328, filed on Feb. 19, 2014, which is hereby incorporated by reference herein in its entirety.

What is claimed is:

1. An image processing apparatus comprising:
   at least one processor or circuit programmed to perform the functions of the following units:
   a motion detection unit configured to detect motion of an object based on an output from an image pickup element;
   a first calculation unit configured to calculate, based on an output from the motion detection unit, a move amount of the object;
   a second calculation unit configured to calculate, based on an output from a shake detection unit which detects a panning amount of an image pickup apparatus which is panned, a move amount of the image pickup apparatus;
   a control unit configured to perform control, based on a difference between information of the panning amount and information of the move amount of the object, so as to correct the difference by moving an optical element in a direction different from an optical axis direction; and
   a determination unit configured to determine, based on the difference, whether to perform panning shot through use of the optical element to correct the difference,
   wherein the determination unit determines
      to perform the panning shot through the use of the optical element to correct the difference when the difference is not greater than a first threshold, and
      not to perform the panning shot through the use of optical element to correct the difference when the difference is greater than the first threshold.

2. The image processing apparatus according to claim 1, wherein
   the first threshold changes depending on a focal length.

3. The image processing apparatus according to claim 1, wherein
   the motion detection unit is a motion vector detection unit, and
   the shake detection unit is an angular velocity detection unit.

4. The image processing apparatus according to claim 1, wherein
   the determination unit, having determined not to perform the panning shot through the use of the optical element to correct the difference, detects again motion of the object through the use of the motion detection unit and determines again, based on the detected motion of the object, whether to perform the panning shot through the use of the optical element to correct the difference.

5. The image processing apparatus according to claim 1, further comprising:
   a setting unit configured to perform setting of whether to perform the panning shot through the use of the optical element to correct the difference; and
   a warning unit configured to warn a user when setting to perform the panning shot through the use of the optical element to correct the difference is made by the setting unit and the determination unit determines not to perform the panning shot through the use of the optical element to correct the difference.

6. An image pickup apparatus comprising:
   an image processing apparatus according to claim 1; and
   an image pickup element.

7. The image processing apparatus according to claim 1, wherein the determination unit determines, on condition that the difference exists,
   to perform the panning shot through the use of the optical element to correct the difference when the difference is not greater than a first threshold, and
   not to perform the panning shot through the use of the optical element to correct the difference when the difference is greater than the first threshold.

8. The image processing apparatus according to claim 1, wherein
the determination unit, having determined not to perform the panning shot through the use of the optical element to correct the difference, determines again, based on a time until next image capturing starts and a second threshold, whether to detect motion of the object through the use of the motion detection unit.

9. The image processing apparatus according to claim 8, wherein
when the time is longer than the second threshold, the determination unit detects again motion of the object through the use of the motion detection unit and determines again, based on the detected motion of the object, whether to perform the panning shot through the use of the optical element to correct the difference.

10. A method of controlling an image processing apparatus comprising:
a shaking detection step of detecting a panning amount of an image pickup apparatus which is panned;
a motion detection step of detecting motion of an object based on an output from an image pickup element;
a first calculation step of calculating, based on an output at the motion detection step, a move amount of the object;
a second calculation step of calculating, based on an output at the shake detection step, a move amount of the image pickup apparatus;
a control step of performing control, based on a difference between information of the panning amount and information of the move amount of the object, so as to correct the difference by moving an optical element in a direction from an optical axis direction; and
a determination step of determining, based on the difference, whether to perform panning shot through use of the optical element to correct the difference.

11. An image processing apparatus comprising:
at least one processor or circuit programmed to perform the functions of the following units:
a motion detection unit configured to detect motion of an object based on an output from an image pickup element;
a first calculation unit configured to calculate, based on an output from the motion detection unit, a move amount of the object;
a second calculation unit configured to calculate, based on an output from a shake detection unit which detects a panning amount of an image pickup apparatus which is panned, a move amount of the image pickup apparatus;
a control unit configured to perform control, based on a difference between information of the panning amount and information of the move amount of the object, so as to correct the difference by moving an optical element in a direction different from an optical axis direction; and
a determination unit configured to determine, based on the difference, whether to perform panning shot through use of the optical element to correct the difference,
wherein the determination unit determines that when the difference is not greater than a first threshold, the panning shot succeeds and performs the panning shot through the use of the optical element to correct the difference,
wherein the determination unit determines that when the difference is greater than the first threshold, the panning shot fails and does not perform the panning shot through the use of the optical element to correct the difference.

12. A method of controlling an image processing apparatus comprising:
a shaking detection step of detecting a panning amount of an image pickup apparatus which is panned;
a motion detection step of detecting motion of an object based on an output from an image pickup element;
a first calculation step of calculating, based on an output at the motion detection step, a move amount of the object;
a second calculation step of calculating, based on an output at the shake detection step, a move amount of the image pickup apparatus;
a control step of performing control, based on a difference between information of the panning amount and information of the move amount of the object, so as to correct the difference by moving an optical element in a direction from an optical axis direction; and
a determination step of determining, based on the difference, whether to perform panning shot through use of the optical element to correct the difference,
wherein the determination step determines that when the difference is not greater than a first threshold, the panning shot succeeds and performs the panning shot through the use of the optical element to correct the difference, and
wherein the determination step determines that when the difference is greater than the first threshold, the panning shot fails and does not perform the panning shot through the use of the optical element to correct the difference.

* * * * *